INVENTORS
CLARENCE W. CLAXTON
EDWARD N. ESMAY

ATTORNEY

INVENTORS
CLARENCE W. CLAXTON
EDWARD N. ESMAY

BY Frank C. Baker

ATTORNEY

INVENTORS
CLARENCE W. CLAXTON
EDWARD N. ESMAY

ATTORNEY

United States Patent Office 3,444,760
Patented May 20, 1969

3,444,760
BACKLASH CONTROL MEANS FOR
INTERNAL GEARING
Clarence W. Claxton, Chili, and Edward N. Esmay,
Brighton, N.Y., assignors to Bausch & Lomb Incorporated, Rochester, N.Y., a corporation of New York
Filed Dec. 26, 1967, Ser. No. 693,319
Int. Cl. F16h *35/10, 33/00*
U.S. Cl. 74—640                                              5 Claims

ABSTRACT OF THE DISCLOSURE

Backlish control means for a gear reduction mechanism which prevents lost motioin and ratcheting of the teeth of an internal gear with respect to a pinion meshed therewith the pitch diameter of said pinion being smaller than the pitch diameter of the gear, i.e., one gear has more teeth than the other. Either the gear or the pinion is made of flexible material and it is pressed and distorted into full engagement with the other member at two opposite positions thereon principaly by a semi-circular spring snap ring which acts against a pair of contacting pressure arms, and furthermore the deformation of the flexible member at said positions under excessive load is limited to an amount which prevents ratcheting of the teeth by a rigid stop means which is fitted to effect a predetermined maximum displacement of the flexible member.

Background of the invention

The apparatus wherein the present invention is used is generally known at a Flexspline or harmonic drive device which has been found to be particularly useful, for instance, in the fine and coarse adjustment mechanism of a microscope where smooth and even movements of small degree are required. Such a mechanism is represented in one of its forms in the patent issued to C. W. Musser on June 8, 1965, No. 3,187,862.

In one form of harmonic drive mechanism shown and described herebelow, the drive and driven members are inverted, i.e., the drive member is constructed in the form of a shell-like internal ring type gear of flexible material and the driven meshing pinion located within the gear is made of rigid material such as metal. In such an arrangement, the so-called "wave generator," mentioned in the Musser patent, is constructed as a pair of axially projecting pressure lugs or arms which are solidly anchored in an axial direction at opposite positions so as to extend over the outer diameter of the Flexspline gear and contact it with a slight yielding inward pressure toward each other. Said pressure permits easy operation of the gearing and low starting torque but has the disadvantage of permitting ratcheting the teeth of the gearing upon excessive overloading. For purposes of this invention, it is important that at no time is there any backlash in the operation of the gearing and consequently gear teeth ratcheting must be strictly avoided.

Summary of the invention

The present invention relates to internal gearing generally and more particularly it relates to means for eliminating backlash and ratcheting or disengagement between the teeth of the internal gear and the teeth of the pinion of said gearing when excessive overloading occurs.

In view of the stated difficulties, it is an object of the present invention to provide a harmonic drive mechanism having the aforementioned Flexspline structure so constructed as to provide mechanism for preventing ratcheting of the gear teeth upon excessive overload thereof.

It is a further object to provide such a device which maintains the teeth of said gearing free from backlash under normal loading conditions but permits slight yielding of the drive mechanism under overloads, said device being small and compact while being comparatively strong and reliable.

It is a still further object to provide such a gearing mechanism wherein the running torque is low and the starting torque is not much greater than running torque.

Further objects and advantages are to be found in the form and arrangement of the parts of the present invention and in the details of the construction thereof as described in the specification herebelow, taken together with the accompanying drawings.

Description of preferred form of invention

Figure 1:
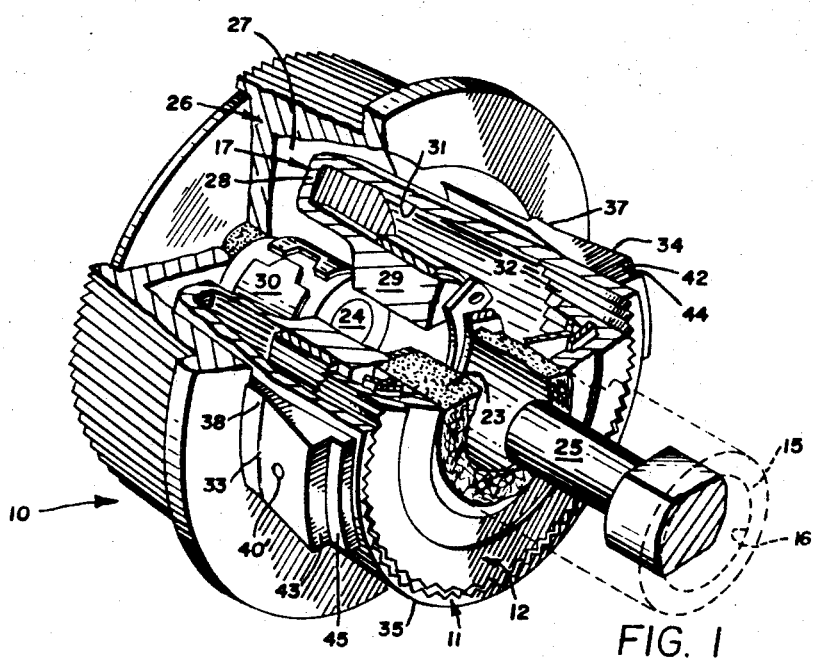
FIG. 1 is an assembled perspective view of the principal parts of the preferred form of the invention, parts thereof being broken away and shown in section to illustrate the important details.
Figure 2:
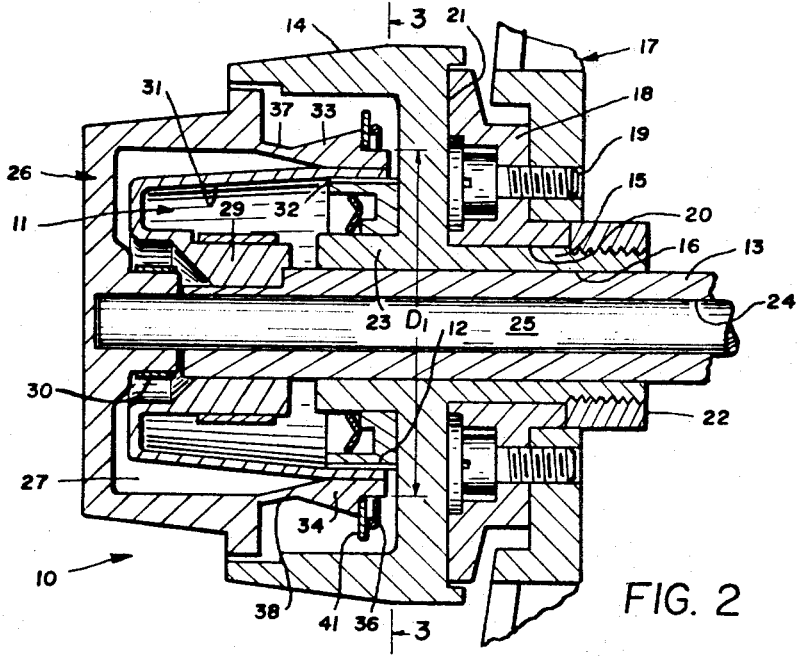
FIG. 2, is a midsectional view of the parts shown in FIG. 1 as assembled.

With reference to FIGS. 1 and 2 of the drawings, there is provided a gear reduction device generally indicated by numeral 10 which is particularly advantageous as an operating unit of a microscope, due primarily to its smooth and powerful operating characteristics.

The gear reduction mechanism 10 may be built in a variety of forms to solve different operating problems and in fact may be some form of splines, the preferred form being described herebelow for use in a microscope because of its advantages in smooth and reliable operation and low cost.

Said mechanism is generally constructed like internal gearing by using an internal drive gear 11 and a concentric driven pinion 12. The pitch diameter of the pinion 12 is smaller than the nominal pitch diameter of the drive gear 11 by an amount such that the gear teeth do not mesh with each other except when one gear is distorted in shape under pressure toward the other gear for a purpose to be explained hereinafter.

For mounting the internal gearing, as shown in FIG. 2, a hollow coarse adjustment shaft 13 is provided which is connected in the usual manner to a coarse adjustment mechanism of known commercial form not shown. A frictional drag mechanism of any preferred form, not shown, is provided for opposing rotation of shaft 13. On the hollow shaft 13 is rotatably mounted a coarse adjustment operating knob 14 having an annular extension or hub 15 whereon is formed an inner bearing surface 16. In a microscope frame which is fragmentally shown at 17, a bearing member 18 is fixed by suitable means such as the screws 19.

In the bearing member 18 a bore 20 is formed which rotatably journals the hub 15 for rotation therein. Relative axial movement of the hub 15 and knob 14 is prevented by frictional drag means including the radial face 21 formed on knob 14 at one end of the bearing member 18 and at the other end thereof a stop nut 22 is fixed to the hub 15. Tightening of stop nut 22 causes increased pressure on the face 21. On the coarse adjustment knob 14 opposite to hub 15 is formed a second hub 23, the driven pinion member 12 being suitably formed to press tightly or otherwise be secured on the outside diameter of said second hub 23.

Rotatably fitted in a bore 24 formed in hollow shaft 13 is a fine adjustment shaft 25 which projects freely beyond shaft 13. On the free end of shaft 25 is frictionally secured an adjustment operating knob 26 as shown in FIG. 2 which is cup-shaped in form to provide an interior space 27 for housing the aforesaid internal gearing.

Adjacent to the inner face of the knob 26 on the outer end of hollow shaft 13 is frictionally or otherwise secured the aforesaid flexible driven gear 11, the hub 29 thereof being clamped with compressive stress by a constricting spring clip 30 and preferably having a non-circular connection to shaft 13. For this purpose, the gear hub 29 is provided with a series of radial axial slots not shown which permit the compression.

Figure 3:
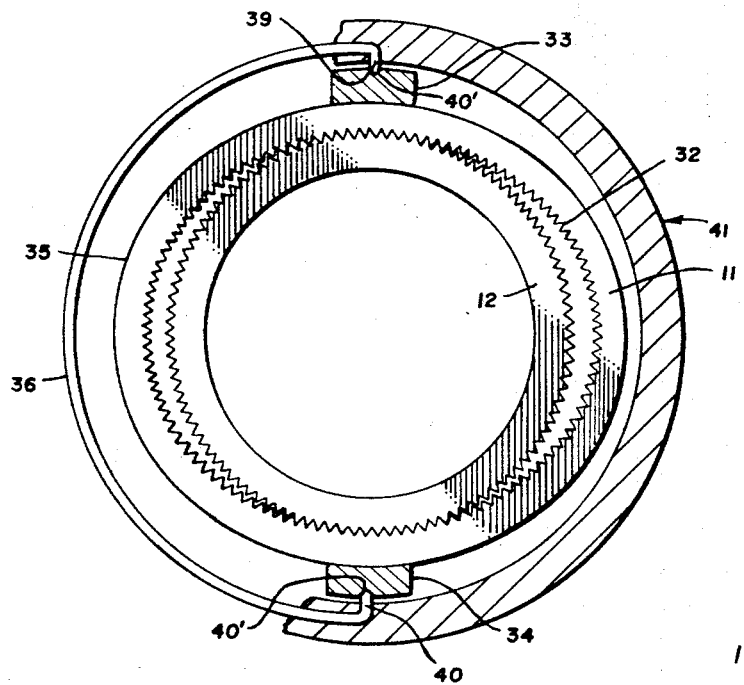
FIG. 3 is a cross-sectional view taken on the section line 3—3 of FIG. 2 showing one operating position of said parts.

The internal gear 11 is formed of a tough flexible material in the shape of a deep cup 31 as shown in FIGS. 1 and 2 having the internal teeth or splines 32 formed on the rim portion thereof. As shown in FIG. 2, the internal teeth 32 are located in a position to engage the teeth of the pinion 12 although such engagement depends on a considerable flexure of the rim of the internal gear 11 as shown in FIG. 3.

Such flexure of gear portion 31 is secured at two opposite points by means of two salient pressure arms 33 and 34 which are formed in cantilever fashion on the inner face of the knob 26 which lies nearest to the teeth 32. The two pressure arms 33 and 34 are somewhat flexibly constructed in any desired manner so as to bear inwardly with some definite radial force against the outer smooth surface 35 of gear 11 whereby normal engagement of the teeth of the gear and pinion as shown in FIGS. 2 and 3 is secured.

Figure 6:
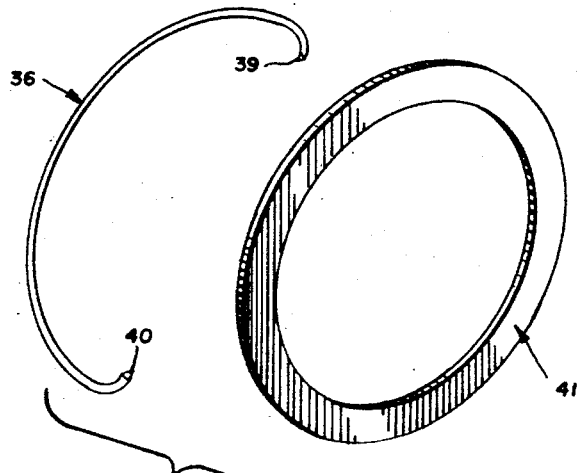
FIG. 6 is a detailed perspective view of certain essential operating parts of the invention.

According to the present invention, a contracting spring, preferably constructed of spring steel in the form of a semi-circular clip 36 as shown in FIG. 6, is provided for increasing the tooth engagement pressure between the gear teeth 32 of the gear 11 and pinion 12 by a definite amount. As seen in FIG. 2, the pressure arms 33 and 34 are somewhat reduced in section as indicated by recesses 37 and 38 to provide enough yield or flexibility which would allow torsional overloads to be reduced somewhat by partial relative disengagement movement of the gear teeth 32. The aforesaid spring clip 36 has sharp end spurs 39 and 40 which preferably engage in small depressions 40' FIGS. 1 and 3 of drawing formed in the outer surfaces of the arms 33 and 34. The exact form of the spring clip 36 shown and above described is not exclusive and may be constructed in any one of several geometrical forms and the spurs 39 and 40 alternatively may if desired be constructed as ball tips.

In this or any alternative design, the spring clip 36 should be so constructed as to apply about one to three pounds of pressure to the arms 33 and 34 although higher pressures may be desirable for some mechanisms. If the teeth of the gear 11 and pinion 12 are well formed, the lesser pressure is usually found to be sufficient for firmly engaging the teeth and preventing backlash. However, poorly formed teeth or slightly mismatched teeth in the gearing require much higher pressure such as 3 lbs. or more in order to reliably prevent backlash. Although gear tooth wear is less when pressures on the low side of the range of values are used, even the pressures of 3 lbs. or more does not produce noticeable deletary results on the teeth.

When the gear teeth are overloaded greater than the rated transmission force, the pressure arms 33, 34 and spring 36 are insufficient to retain full meshing of teeth 32 and the teeth 32 and tend to unmesh due to the flexibility of the pressure arms 33 and 34 and the expansion of the spring clip 36, i.e.; the teeth of the flexible gear 11 rise on the teeth of the pinion 12 until ratcheting occurs during which the teeth of the gear are momentarily disengaged from the teeth of the pinion.

In order to prevent such ratcheting of the teeth, a second feature is contributed to the present invention in the form of an expansion stop ring 41 which is supported on the outer part of the pressure arms 33 and 34 as set forth herebelow.

Adjacent to the respective recesses 37 and 38 in the arms 33 and 34 is formed a coplanar pair of radial shoulders 42 and 43 as best shown in FIG. 1 which position the stop ring 41 axially on said arms. The baseline of the shoulders 42 and 43 terminates in a pair of sealing surfaces 44 and 45 which form two opposite arcuate elements or surfaces of identical diameter on said pressure arms 33 and 34, said diameter being designated $D_1$ in FIGS. 2 and 4 of the drawing.

Figure 4:
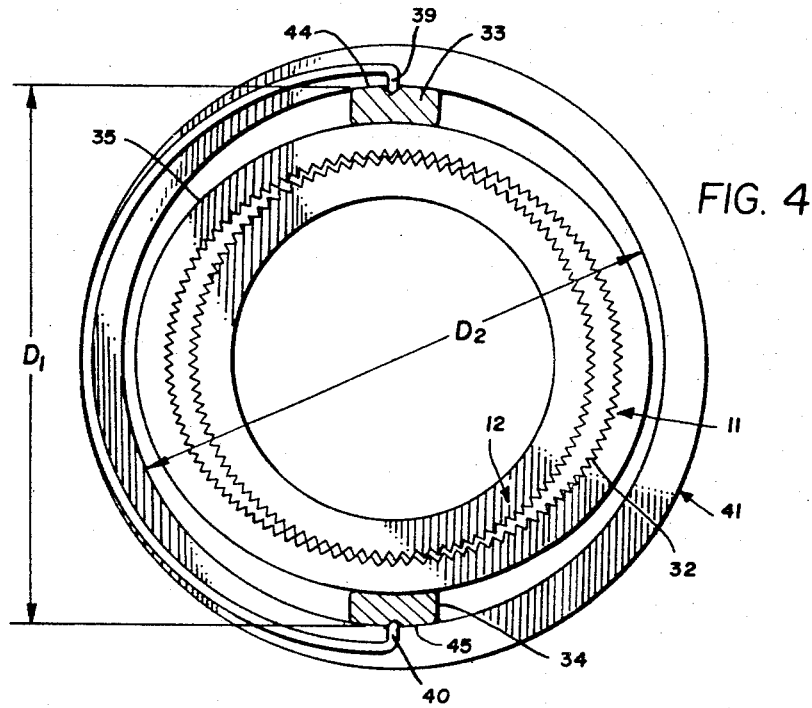
FIG. 4 is a view similar to FIG. 3 showing another operating position of said parts somewhat exaggerated.

For the purposes of this invention, it is important as shown in FIG. 4 that the inside diameter $D_2$ of the expansion stop ring 41, have a dimension which is larger than the normal outer diameter $D_1$ of the arms 33 and 34 when the outer gear 11 is fully compressed, the difference $(D_2-D_1)$ being less than twice the whole depth of the teeth of the gearing, or as stated in the mathematical expression herebelow, $$D_2 < D_1 + 2WD$$

where WD represents the whole depth of one of the teeth of said gearing.

In all forms of the invention the above described principle applies by the coordinated action of:

(a) The compressive force of spring 36 against the pressure arms 33 and 34 to yieldingly fully mesh gear teeth 32.

(b) The action of the stop ring 41 to limit the expanding or unmeshing motion of the teeth on the flexible gear so as to prevent ratcheting of the teeth.

It will be understood the torque requirements for the aforesaid "running" torque as well as "starting" torque tend to increase as the work load on the gears 11 and 12 is increased, and in the above described gearing, but nevertheless the rotation of shaft 25 and knob 26 is initiated without jerk or shock.

Figure 5:
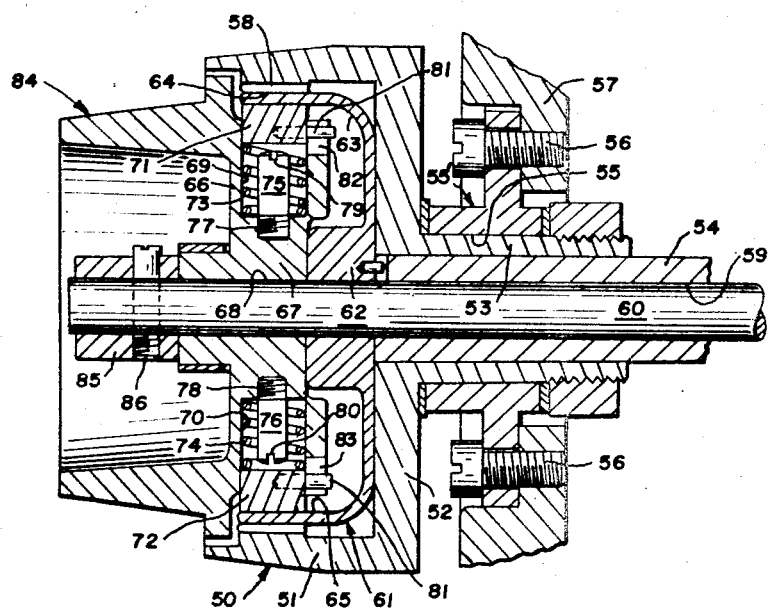
FIG. 5 is a view similar to FIG. 2 showing a second form of the present invention in normal operating position.

A second form of the invention is shown in FIG. 5 wherein the pinion member is the flexible drive member instead of the other gear member as described in the first form of the invention.

In the second form of the invention the outer gear member is shown generally at 50 having a rim portion 51 which is joined to a radial wall 52. The wall 52 terminates inwardly in an elongated hub 53 which is journaled and secured lengthwise onto a coarse adjustment drive tube 54 which serves as an actuating member for moving a microscope slide or other device to be moved, not shown. On the outer surface 55 of the hub 53 is rotatably journaled a bearing member 55' which is secured by a screw 56 onto a microscope frame shown fragmentarily at 57.

Gear member 50 in the second form of the invention is formed of rigid materials such as metal, and on the interior surface of the rim portion 51 are formed gear teeth or splines 58.

In the so-called coarse adjustment drive tube 54 is formed a smooth bore 59 wherein is journaled a so-called fine adjustment shaft 60 in a manner similar to the first form of the invention. On the fine adjustment shaft 60 is mounted a pinion member generally indicated by numeral 61. Pinion member 61 is formed with a solid hub portion 62 and an integral flexible cup-like portion 63 which is preferably formed from a flexible, tough and durable organic plastic material.

On the outer diameter of the cup-like portion 63 are formed gear teeth 64 which match the teeth or splines 58 formed on the gear member 50. Similarly to the first form of the invention, the nominal pitch diameter of the pinion teeth 64 is less than the pitch diameter of teeth 58 on gear member 50 by such an amount that the gear teeth of the gear and pinion would not mesh together unless the rim 63 of the pinion were considerably expanded at two opposite points.

In the second form of the invention, expansion or "wave-motion" means for meshing the gear teeth are provided, said means acting in two diametrically opposite positions to yieldably contact with the inner surface 65 of the flexible portion 63 of pinion member 61. Said expansion means comprises a radial thick wall 66 having a hub 67 formed thereon wherein a bore 68 is formed which closely fits the inner shaft 60.

Formed radially in the wall 66 is a pair of diametrically opposite blind bores 69 and 70 in axial or longitudinal alignment with the gear teeth 64, 58. In said bores 69, 70 are slidably fitted a pair of pressure plugs 71, 72 respectively which move therein under the expansion force transmitted by a pair of springs 73 and 74 to engage the teeth of gears 58 and 64.

The spring pressure transmitted to the pressure plugs 71, 72 is intended to be strong enough to reliably engage the gear teeth fully and upon overload to allow some yielding of the flexible rim 63 toward unmeshed position but not enough in any case to allow ratcheting of the teeth.

This last mentioned feature is provided by fixing a pair of stop pins 75 and 76 in the form of a screw having mating attachment threads 77 and 78 formed thereon which are threaded into tapped holes in the wall 66 and furthermore having means for turning the pins, such as the screwdriver slots 79 and 80.

To prevent the plugs 71 and 72 from turning in the bores 69 and 70, a small pin 81 is fixed in any desired manner in each of the plugs 71 and 72 so as to protrude therefrom into the open slots 82 and 83 lengthwise of said bores, the last named slots being freely fitted to the pins 81.

The radial wall 66 is preferably formed as part of a "fine adjusting" operating knob 84 which is held on the fine adjustment shaft 60 by a stop ring 85 held thereon by any desired means such as a lock pin 86 extending through an opening in the shaft 60.

In operation of the last described microscope fine adjustment mechanism, rotation of the knob 84 causes the pressure plugs 75 and 76 to advance rotationally along the inside surface 63 of the yielding pinion 61, distorting the pinion outwardly at two opposite points so that full depth of tooth engagement is effected at said points. Since the number of teeth in the outer gear 50 is always greater than the number of teeth in the pinion member 64, a gear reduction function between driving and driven members is effected, the value of the reduction factor being directly dependent on the number of teeth (58) in the internal gear versus the number of teeth (64) in the pinion.

Although only certain forms of the invention have been shown and described, other forms are possible and changes may be made in the form and arrangement of the parts thereof and in the details of construction and substitutions may be made therein without departing from the spirit of the invention as defined in the claims appended herebelow.

I claim:

1. Backlash control means for an internal reduction gearing mechanism which includes an internal gear member, a pinion member having a nominal pitch diameter less than said gear member, one of said members being formed of rigid material and the other being formed of tough flexible material, a frame member, a shaft carrying member having formed thereon an elongated hub which is journaled in a bore in said frame member, frictional drag means cooperatively formed in interacting relationship on said frame and shaft carrying member to oppose relative rotation therebetween, a tubular driven member rotatably journaled in a bore in said shaft carrying member, said flexible gear member being secured on said tubular driven member, an actuating shaft rotatably journaled in said tubular driven member, the rigid gear member being fixed on said shaft carrying member, an adjustment member fixed onto said actuating shaft, a smooth annular surface formed on the flexible gear member in the plane of the teeth on said gear members, means including a pair of opposed spring actuated pressure members carried by said adjustment member and projecting therefrom into contact with said smooth surface on the flexible gear member to mesh the teeth of the gear members, the improvement which consists of spring means extending under spring stress between two pressure seats formed in the plane of said gear member individually on said pressure members, said spring means serving to augment the normal spring action transmitted by said pressure members to fully mesh said gear members during relatively large variations in the transmitted load.

2. Backlash control means for an internal reduction gearing mechanism which includes an internal gear member, a pinion member having a nominal pitch diameter less than said gear member, one of said members being formed of rigid material and the other being formed of tough flexible material, a frame member, a shaft carrying member having formed thereon an elongated hub which is journaled in a bore in said frame member, frictional drag means cooperatively formed in interacting relationship on said frame and shaft carrying member to oppose relative rotation therebetween, a tubular driven member rotatably journaled in a bore in said shaft carrying member, said flexible gear member being secured on said tubular driven member, an actuating shaft rotatably journaled in said tubular driven member, the rigid gear member being fixed on said shaft carrying member, an adjustment member fixed onto said actuating shaft, a smooth annular surface formed on the flexible gear member in the plane of the teeth on said gear members, means including a pair of opposed spring actuated pressure members carried by said adjustment member and projecting therefrom into contact with said smooth surface on the flexible gear member to mesh the teeth of the gear members, the improvement which consists of a substantially circular spring biasing member which is shaped to partially encircle said adjustment member and is provided at each end with a contact element which is seated against one of said pressure member so as to bias said members inwardly toward each other.

3. Backlash control means for an internal reduction gearing mechanism which includes an internal gear member, a pinion member having a nominal pitch diameter less than said gear member, one of said members being formed of rigid material and the other being formed of tough flexible material, a frame member, a shaft carrying member having formed thereon an elongated hub which is journaled in a bore in said frame member, frictional drag means cooperatively formed in interacting relationship on said frame and shaft carrying member to oppose relative rotation therebetween, a tubular driven member rotatably journaled in a bore in said shaft carrying member, said flexible gear member being secured on said tubular driven member, an actuating shaft rotatably journaled in said tubular driven member, the rigid gear member being fixed on said shaft carrying member, an adjustment member fixed onto said actuating shaft, a smooth annular surface formed on the flexible gear member in the plane of the teeth on said gear members, means including a pair of opposed spring actuated pressure members carried by said adjustment member and projecting therefrom into contact with said smooth surface on the flexible gear member to mesh the teeth of the gear members, the improvement which consists of spring means extending under spring stress between two pressure seats formed in the plane of said gear member individually on said pressure members, said spring means serving to augment the normal spring action transmitted by said pressure members to fully mesh said gear members, and solid abutment means carried by said adjustment member, said means comprising a pair of abutment surfaces lying across the path of movement of said pressure members when relieving excess gear loads, said abutment surfaces being solidly connected together by intervening rigid material in fixed spaced relation to each other, the total permissable movement of said pressure members being less than twice the whole depth of the teeth in the gearing.

4. Backlash control means for an internal reduction gearing mechanism which includes an internal gear member, a pinion member having a nominal pitch diameter less than said gear member, one of said members being formed of rigid material and the other being formed of tough flexible material, a frame member, a shaft carrying member having formed thereon an elongated hub which is journaled in a bore in said frame member, frictional drag means cooperatively formed in interacting relationship on said frame and shaft carrying member to oppose relative rotation therebetween, a tubular driven member rotatably journaled in a bore in said shaft carrying member, said flexible gear member being secured on said tubular driven member, an actuating shaft rotatably journaled in said tubular driven member, the rigid gear member being fixed on said shaft carrying member, an adjustment member fixed onto said actuating shaft, a smooth nominally cylindrical surface formed on the flexible gear member in the plane of the teeth on said gear members, means including a pair of diametrically opposed spring actuated pressure members carried by said adjustment member and projecting therefrom into contact with said smooth surface on the flexible gear member to force the meshing of the teeth of the gear members, the improvement which consists of a substantially semi-circular spring biasing member which partially encircles said pressure members, an inturned contact element which is formed on each end of said spring member and which is seated against one of said pressure members so as to bias said pressure members inwardly toward each other, a continuous ring type abutment member carried transversely of the pressure members by the adjustment member, and a pair of diametrically opposed abutment surfaces formed on the inner part of said abutment member at a fixed dimension $D_2$ according to the mathematical statement $$D_2 < D_1 + 2WD$$

where $D_1$ represents the overall outer dimension of the abutment elements on said pressure members when the gear teeth are tightly meshed and WD represents the whole depth of the teeth of the gearing.

5. Backlash control means for an internal reduction gearing mechanism which includes an internal gear member, a pinion member having a nominal pitch diameter less than said gear member, one of said members being formed of rigid material and the other being formed of tough flexible material, a frame member, a shaft carrying member having formed thereon an elongated hub which is journaled in a bore in said frame member, frictional drag means cooperatively formed in interacting relationship on said frame and shaft carrying member to oppose relative relation therebetween, a tubular driven member rotatably journaled in a bore in said shaft carrying member, said flexible gear member being secured on said tubular driven member, an actuating shaft rotatably journaled in said tubular driven member, the rigid gear member being fixed on said shaft carrying member, an adjustment member fixed onto said actuating shaft, a smooth nominally cylindrical surface formed on the flexible gear member in the plane of the teeth on said gear members, the improvement which consists of a substantially semi-circular spring biasing member which partially encircles said pressure members, an inturned contact element which is formed on each end of said spring member and which is seated against one of said pressure members so as to bias said pressure members inwardly toward each other, a continuous ring type abutment member carried transversely of the pressure members by the adjustment member, a pair of diametrically opposed abutment surfaces formed on the inner part of said abutment member at a fixed dimension $D_2$ according to the mathematical statement $$D_2 < D_1 + 2WD$$

where $D_1$ represents the overall outer dimension of the abutment elements on said pressure members when the gear teeth are tightly meshed and WD represents the whole depth of the teeth of the gearing, and a pair of substantially coplanar radial locating shoulders formed respectively on a corresponding outer surface of each of the pressure members transversely to said shaft so as to axially position said abutment member.

References Cited
UNITED STATES PATENTS

| | | | |
|---|---|---|---|
| 3,088,333 | 5/1963 | Musser | 74—640 |
| 3,116,650 | 1/1964 | Farley | 74—640 X |
| 3,362,254 | 1/1968 | Lewis | 74—640 |
| 3,385,116 | 5/1968 | Carlson et al. | 74—10.54 |

ARTHUR T. McKEON, *Primary Examiner.*

U.S. Cl. X.R.

74—10.54, 409